(12) United States Patent
Kwon et al.

(10) Patent No.: US 9,246,658 B2
(45) Date of Patent: *Jan. 26, 2016

(54) METHOD FOR TRANSMITTING ACK/NACK SIGNAL IN WIRELESS COMMUNICATION SYSTEM APPLIED CARRIER AGGREGATION AND APPARATUS THEREFOR

(71) Applicant: LG ELECTRONICS INC., Seoul (KR)

(72) Inventors: Yeong Hyeon Kwon, Anyang-si (KR); Jae Hoon Chung, Anyang-si (KR); Seung Hee Han, Anyang-si (KR); So Yeon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/702,396

(22) Filed: May 1, 2015

(65) Prior Publication Data

US 2015/0236837 A1    Aug. 20, 2015

Related U.S. Application Data

(63) Continuation of application No. 14/468,095, filed on Aug. 25, 2014, now Pat. No. 9,036,562, which is a continuation of application No. 14/259,980, filed on Apr. 23, 2014, now Pat. No. 8,848,616, which is a continuation of application No. 14/029,518, filed on Sep. 17, 2013, now Pat. No. 8,743,792, which is a continuation of application No. 13/259,060, filed as application No. PCT/KR2010/001561 on Mar. 12, 2010, now Pat. No. 8,611,281.

(60) Provisional application No. 61/165,907, filed on Apr. 2, 2009, provisional application No. 61/172,203, filed on Apr. 23, 2009.

(51) Int. Cl.
| H04L 5/00  | (2006.01) |
| H04W 74/08 | (2009.01) |
| H04L 1/16  | (2006.01) |
| H04W 72/04 | (2009.01) |

(52) U.S. Cl.
CPC ............ *H04L 5/0055* (2013.01); *H04L 1/1607* (2013.01); *H04W 72/0413* (2013.01); *H04W 74/0833* (2013.01)

(58) Field of Classification Search
CPC . H04L 5/0055; H04L 1/607; H04W 72/0413; H04W 74/0833
See application file for complete search history.

(56) References Cited

U.S. PATENT DOCUMENTS 9,036,562 B2 * 5/2015 Kwon et al. .................. 370/328

* cited by examiner

*Primary Examiner* — Mohammad Anwar
(74) *Attorney, Agent, or Firm* — Birch, Stewart, Kolasch & Birch, LLP

(57) ABSTRACT

A method for transmitting Acknowledgement/Negative-Acknowledgement (ACK/NACK) state information to a base station (BS) at a user equipment (UE) in a wireless communication system. The method according to one embodiment includes receiving two or more transmission blocks through two or more downlink component carriers from the BS; and transmitting information on a number of ACK responses among ACK/NACK responses corresponding to each of the two or more transmission blocks through a single uplink component carrier to the BS.

8 Claims, 12 Drawing Sheets

Single component carrier (e.g. LTE system)

PUCCH format 1a and 1b structure (normal CP case)

METHOD FOR TRANSMITTING ACK/NACK SIGNAL IN WIRELESS COMMUNICATION SYSTEM APPLIED CARRIER AGGREGATION AND APPARATUS THEREFOR

CROSS-REFERENCE TO RELATED APPLICATIONS

This application a continuation of co-pending U.S. patent application Ser. No. 14/468,095, filed on Aug. 25, 2014, which is a continuation of U.S. patent application Ser. No. 14/259,980, filed Apr. 23, 2014 (now U.S. Pat. No. 8,848,616, issued on Sep. 30, 2014), which is a continuation of U.S. patent application Ser. No. 14/029,518, filed Sep. 17, 2013 (now U.S. Pat. No. 8,743,792, issued on Jun. 3, 2014), which is a continuation of U.S. patent application Ser. No. 13/259,060, filed Sep. 22, 2011 (now U.S. Pat. No. 8,611,281, issued on Dec. 17, 2013), which is the national phase of PCT International Application No. PCT/KR2010/001561, filed Mar. 12, 2010, which claims priority to U.S. Provisional Applications No. 61/165,907 filed Apr. 2, 2009 and 61/172,203 filed Apr. 23, 2009. The entire contents of all of the above applications are hereby incorporated by reference.

BACKGROUND OF THE INVENTION

1. Field of the Invention

The present invention relates to a wireless communication system. And, more particularly, the present invention relates to a method for transmitting ACK/NACK signal in a wireless communication system applied carrier aggregation and apparatus therefor.

2. Discussion of the Related Art

As an example of a wireless communication system to which the present invention may be applied, a 3GPP LTE (3rd Generation Partnership Project Long Term Evolution; hereinafter referred to as "LTE") communication system will now be broadly described.

FIG. 1 illustrates a general view of an E-UMTS network structure as an example of a wireless communication system. Herein, the E-UMTS (Evolved Universal Mobile Telecommunications System) corresponds to a system evolved from the conventional UMTS (Universal Mobile Telecommunications System). The 3GPP is presently carrying out a basic standardization process for the E-UMTS. Generally, the E-UMTS may also be referred to as an LTE system. For details of the technical specifications of the UMTS and the E-UMTS, reference may be made to Release 7 and Release 8 of "3rd Generation Partnership Project; Technical Specification Group Radio Access Network".

Referring to FIG. 1, the E-UMTS includes a User Equipment (UE) (120), base stations (eNode B; eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits Downlink (DL) scheduling information of downlink data to the corresponding user equipment to notify information related to time and frequency domains to which data will be transmitted, encoding, data size, and HARQ (Hybrid Automatic Repeat and reQuest). Also, the base station transmits Uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) basis, wherein one TA includes a plurality of cells.

The wireless communication technology has been developed up to the LTE based upon WCDMA. However, the demands and expectations of the users and the manufacturers and providers are growing continuously. Also, since other wireless access technologies are constantly being developed, the wireless communication technology is required to newly evolve in order to ensure competiveness in the future. Accordingly, characteristics, such as reduced cost for each bit, increased service availability, usage of a flexible frequency band, simple structure and open interface, and adequate power consumption of the user equipment are being requested.

Recently, a standardization procedure for a succeeding (or subsequent) technology of the LTE has been under progress by the 3GPP. In the description of the present invention, the above-mentioned technology will be referred to as "LTE-Advanced" or "LTE-A". The essential difference between the LTE system and the LTE-A system is the system bandwidth. The LTE-A system aims to support a broadband of up to 100 MHz. For this, the LTE-A system encourages the use of a carrier aggregation (or bandwidth aggregation) technology, which achieves a broadband by using multiple component carriers. In order to use a wider (or broader) frequency band, the carrier aggregation (or bandwidth aggregation) uses a plurality of component carriers as a single large logical frequency band. The bandwidth of each component carrier (or bandwidth carrier) may be defined based upon the bandwidth of a system block used in the LTE system. Each component carrier (or bandwidth carrier) uses a component carrier (or bandwidth carrier) so as to be transmitted.

The present invention is devised to provide a method for transmitting a control signals and an apparatus of the same in a wireless communication system. Also, the present invention is devised to provide a method for transmitting ACK/NACK signal in a wireless communication system applied carrier aggregation and apparatus therefore.

The technical objectives that are to be realized by the present invention will not be limited only to the technical objects pointed out herein. Other technical objectives that have not yet been mentioned herein will become apparent to those having ordinary skill in the art upon examination of the following or may be learned from practice of the invention.

In an aspect of the present invention, a method for transmitting ACK/NACK (Acknowledgement/Negative-ACK) state information in a wireless communication system includes receiving multiple transmission blocks respectively through multiple downlink component carriers from a base station; determining ACK/NACK responses corresponding to each of the multiple transmission blocks by decoding the multiple transmission blocks; mapping the ACK/NACK responses to a ACK/NACK state information; and transmitting the ACK/NACK state information through a single uplink component carrier, wherein ACK information included in the ACK/NACK state information indicates a number of ACK response among the ACK/NACK responses.

Herein, NACK information included in the ACK/NACK state information may indicate a case where decoding of the multiple transmission blocks all failed.

Also, in the receiving multiple transmission blocks, two or more transmission blocks may be received through at least one downlink component carrier among the multiple downlink component carriers.

Preferably, the step of mapping to the ACK/NACK state information may include a step of mapping a predetermined number of ACK/NACK responses among the ACK/NACK responses to the ACK/NACK state information. Also, the step of transmitting the ACK/NACK state information to the base station may include transmitting the ACK/NACK state information by using one or more PUCCH (Physical Uplink Control CHannel) resources included in the one uplink component carrier.

More preferably, the step of transmitting to the base station may further include modulating the ACK/NACK state information using QPSK (Quadrature Phase Shift Keying).

In another aspect of the present invention, a user equipment includes a receiving module for receiving multiple transmission blocks respectively through multiple downlink component carriers from a base station; a processor for determining ACK/NACK responses corresponding to each of the multiple transmission blocks by decoding the multiple transmission blocks, and for mapping the ACK/NACK responses to a ACK/NACK state information; and a transmitting module for transmitting the ACK/NACK state information through a single uplink component carrier, wherein ACK information included in the ACK/NACK state information indicates a number of ACK response among the ACK/NACK responses. Herein, NACK information included in the ACK/NACK state information may indicate a case where decoding of the multiple transmission blocks all failed.

The receiving module may receive two or more transmission blocks through at least one downlink component carrier among the multiple downlink component carriers. And, the processor may map a predetermined number of ACK/NACK responses among the ACK/NACK responses to the ACK/NACK state information.

Also, the transmitting module may transmit the ACK/NACK state information by using one or more PUCCH (Physical Uplink Control CHannel) resources included in the one uplink component carrier. And, the processor may modulate the ACK/NACK state information using QPSK (Quadrature Phase Shift Keying).

According to the embodiments of the present invention, in a wireless communication system applying carrier aggregation, the ACK/NACK signal may be efficiently transmitted.

The effects that can be achieved in the present invention will not be limited only to the effects pointed out in the description of the present invention. Other effects that have not yet been mentioned herein will become apparent to those having ordinary skill in the art upon examination of the following or may be learned from practice of the invention.

BRIEF DESCRIPTION OF THE DRAWINGS

The accompanying drawings, which are included to provide a further understanding of the invention and are incorporated in and constitute a part of this application, illustrate embodiments of the invention and along with the description serve to explain the spirit and scope (or principle) of the invention.

DETAILED DESCRIPTION OF THE INVENTION

Hereinafter, the structure, operation, and other characteristics according to the preferred embodiments of the present invention will now be described in detail with reference to the accompanying drawings and the details given in the accompanying drawings. Hereinafter, the preferred embodiments of the present invention correspond to examples wherein the technical characteristics of the present invention are applied in a 3GPP system.

Hereinafter, a system, wherein the system band uses a single component carrier, will be referred to as a legacy system or a narrowband system. Respectively, a system, wherein the system band includes multiple component carriers, and wherein at least one or more component carriers are used as a system block of a legacy system, will be referred to as an evolved system or a wideband system. A component carrier used as a legacy system block has the same size as that of a system block of legacy system. Conversely, the sizes of the remaining components carriers are not particularly limited. However, in order to simplify the system, the sizes of the remaining component carriers may also be decided based upon the system block size of the legacy system. For example, the relation between a 3GPP LTE system and a 3GPP LTE-A system corresponds to a relation between a legacy system and an evolved system.

Based upon the above-described definition, the 3GPP LTE system will be referred to as an LTE system or a legacy system in the description. Also, a user equipment supporting the LTE system will be referred to as an LTE user equipment (or terminal) or a legacy user equipment (or terminal). Respectively, the 3GPP LTE-A system will be referred to as an LTE-A system or an evolved system in the description. Also, a user equipment supporting the LTE-A system will be referred to as an LTE-A user equipment (or terminal) or an evolved user equipment (or terminal).

In the description of the present invention, the LTE system and the LTE-A system are used to describe the embodiments of the present invention, for simplicity. However, this is merely exemplary, and the embodiments of the present invention may be applied to any communication system corresponding to the above definition.

Figure 1:
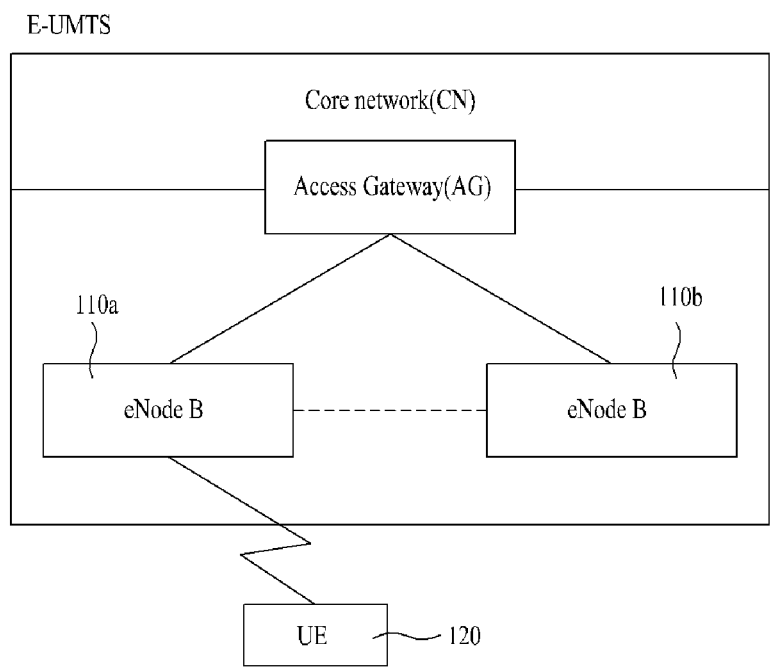
FIG. 1 illustrates a general view of an E-UMTS network structure as an example of a wireless communication system.
Figure 2:
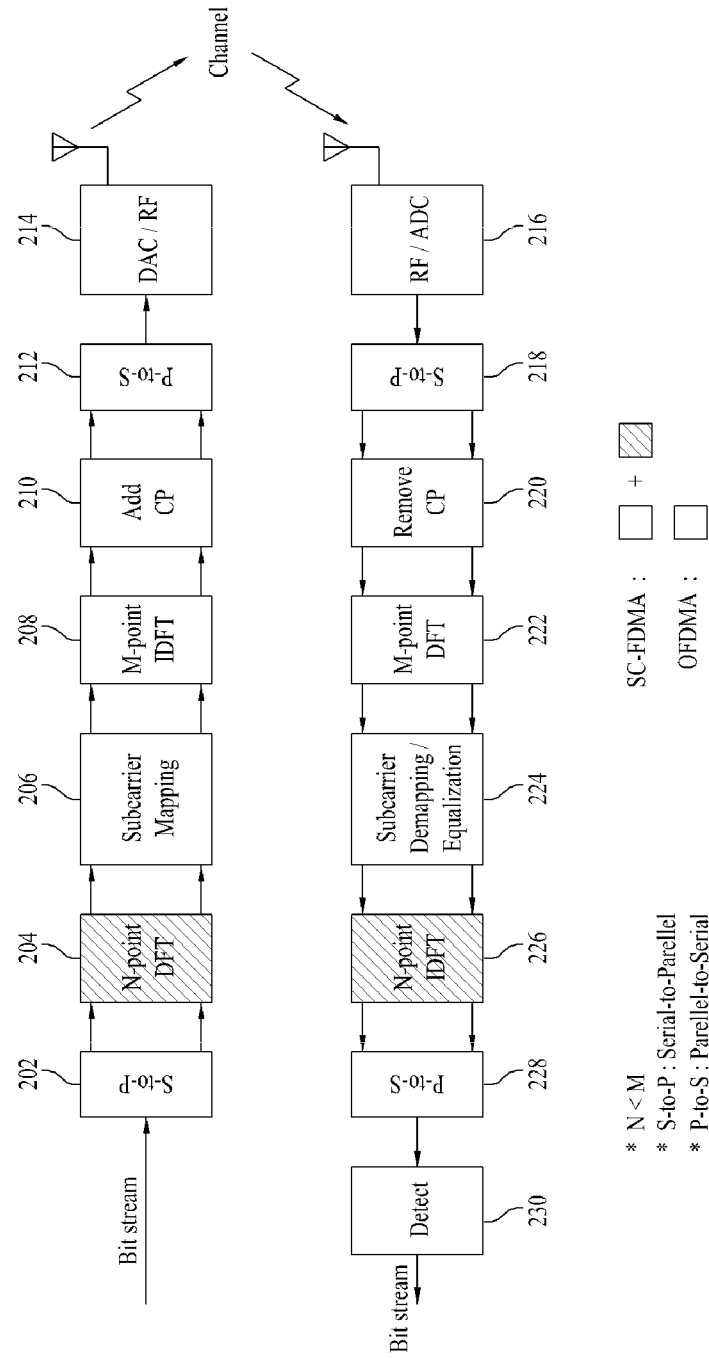
FIG. 2 illustrates block views of a transmitter and a receiver for OFDMA and SC-FDMA.

FIG. 2 illustrates block views of a transmitter and a receiver for OFDMA and SC-FDMA. In an uplink, a transmitter (202~214) is a user terminal, and a receiver (216~230) is a portion of a base station. In a downlink, the transmitter is a portion of the base station, and the receiver is a portion of the user terminal.

Referring to FIG. 2, an OFDMA transmitter includes a Serial to Parallel converter (202), a sub-carrier mapping module (206), an M-point IDFT (Inverse Discrete Fourier Transform module (208), a Cyclic prefix (CP) adding module (210), a Parallel to Serial converter (212), and an RF (Radio Frequency)/DAC (Digital to Analog Converter) module (214).

In the OFDMA transmitter, a signal processing procedure is as described below. Firstly, a bit stream is modulated to a data symbol sequence. The bit stream may be obtained by performing diverse signal processing, such as channel encoding, interleaving, scrambling, and so on, on a data block received (or delivered) from a Medium Access Control (MAC) layer. The bit stream may also be referred to as a codeword and is equivalent to a data block received from the MAC layer. The data block received from the MAC layer may also be referred to as a transmission block. Although the modulation method of the present invention will not be limited to the following examples, the modulation method may include BPSK (Binary Phase Shift Keying), QPSK (Quadrature Phase Shift Keying), and n-QAM (Quadrature Amplitude Modulation). Subsequently, a serial data symbol sequence is converted in parallel by N number of units (202). N number of data symbols is mapped to N number of sub-carriers, which is assigned from a total of M number of sub-carriers. Then, the remaining M-N number of sub-carriers is padded to 0 (206). The data symbols mapped to a frequency domain are converted to a time domain sequence via M-point IDTF processing (208). Thereafter, in order to reduce Inter-Symbol Interference (ISI) and Inter-Carrier Interference (IC), a CP is added to the time domain sequence, thereby generating an OFDMA symbol (210). The generated OFDMA symbol is converted from parallel to serial (212). Afterwards, the OFDMA symbol is processed with procedures such as digital-to-analog conversion, frequency uplink conversion, so as to be transmitted (or delivered) to the receiver (214). Another user is assigned with available sub-carriers among the remaining M-N number of sub-carriers. An OFDMA receiver includes an RF/ADC (Analog to Digital Converter) module (216), a Serial to Parallel converter (218), a Remove CP module (220), an M-point DFT (Discrete Fourier Transform) module (222), a sub-carrier demapping/equalization module (224), a Parallel to Serial converter (228), and a detection module (230). The signal processing procedure of the OFDMA receiver is configured as an inverse procedure of the OFDMA transmitter.

In comparison with the OFDMA transmitter, an SC-FDMA transmitter additionally includes an N-point DFT module (204) before the sub-carrier mapping module (206). Prior to IDTF processing, the SC-FDMA transmitter disperses multiple data to the frequency domain through DFT, thereby being capable of reducing a PAPR (Peak-to-Average Power Ratio) of the transmitting signal, as compared to the PFDMA method. In comparison with the OFDMA receiver, an SC-FDMA receiver additionally includes an N-point IDFT module (226) after the sub-carrier demapping/equalization module (224). The signal processing procedure of the SC-FDMA receiver is configured as an inverse procedure of the SC-FDMA transmitter.

Figure 3:
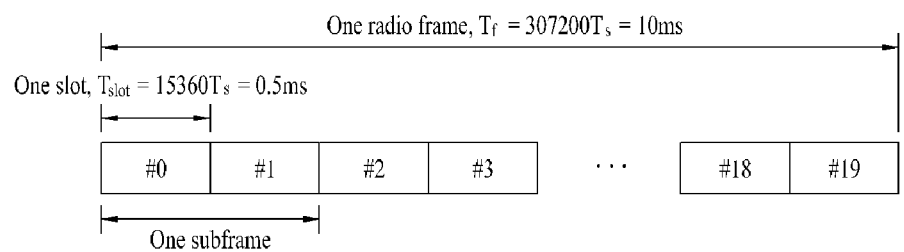
FIG. 3 illustrates an exemplary structure of a wireless frame used in the LTE.

FIG. 3 illustrates an exemplary structure of a wireless frame used in the LTE.

Referring to FIG. 3, a radio frame has the length of 10 ms ($327200 \cdot T_S$) and is configured of 10 subframes each having the same size. Each subframe has the length of 1 ms and is configured of 2 slots. Each slot has the length of 0.5 ms ($15360 \cdot T_S$). Herein, $T_S$ represents a sampling time and is indicated as $T_S=1/(15 \text{ kHz} \times 2048) 3.2552 \times 10^{-8}$ (approximately 33 ns). A slot includes multiple OFDMA (or SC-FDMA) symbols in the time domain and includes multiple Resource Blocks (RBs) in the frequency domain. In the LTE system, one resource block includes 12 subcarriers×7 (6) OFDMA (or SC-FDMA) symbols. A Transmission Time Interval (TTI), which corresponds to a time unit at which the data are transmitted, may be decided as one or more subframe units. The above-described structure of the radio frame is merely exemplary. And, therefore, the number of subframes within a radio frame, the number of slots within a subframe, and the number of OFDMA (or SC-FDMA) symbols within a slot may be diversely modified.

Figure 4:
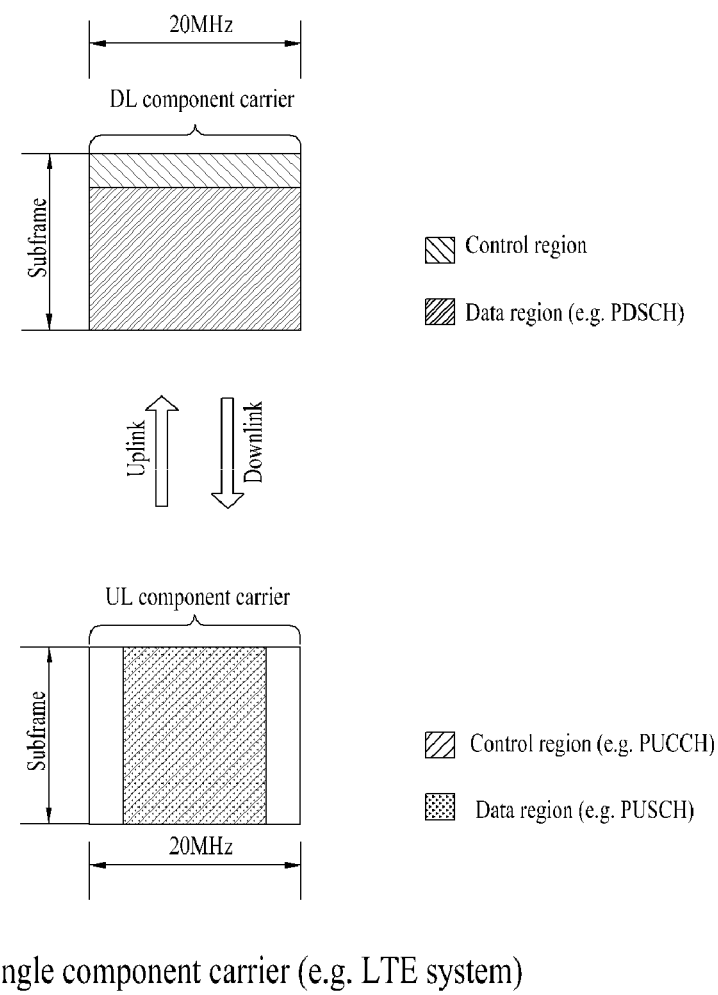
FIG. 4 illustrates an example of performing communication in a single component carrier condition.

FIG. 4 illustrates an example of performing communication in a single component carrier condition. FIG. 4 may correspond to a communication example of the LTE system. In an FDD (Frequency Division Duplex) method, data transmission and reception may be performed via one downlink band and one uplink band respective to the downlink band. More specifically, in the FDD method, the radio frame structure of FIG. 4 is used only in a downlink transmission or an uplink transmission. Conversely, in a TDD (Time Division Duplex) method, the same frequency band is divided into a downlink section and an uplink section respective to the downlink section. More specifically, in the TDD method also, the radio frame structure of FIG. 4 is used only in a downlink transmission or an uplink transmission.

Referring to FIG. 4, a method of performing an HARQ (Hybrid Automatic Repeat and reQuest) procedure by the user equipment (or terminal) will be described in detail. In the LTE system, a control information on a downlink data transmission of the base station (e.g., a scheduling information) is transmitted (or delivered) through a downlink control channel predetermined in a control region of the downlink subframe. The downlink control channel includes a PDCCH (Physical Downlink Control Channel). The user equipment first receives the scheduling information (e.g., resources assigned with data, the size of the data, the coding method, the redundancy version, etc.) through the control channel and may, then, receive scheduled data through a downlink shared channel, which is indicated (or designated) by the scheduling information. The downlink shared channel includes a PDSCH (Physical Uplink Channel). Subsequently, the user equipment may transmit a reception response signal (e.g., HARQ ACK/NACK) for the downlink data through an uplink control channel predetermined within the control region of the uplink subframe. The uplink control channel includes a PUCCH (Physical Uplink Control Channel). In the description of the present invention, the HARQ ACK/NACK will be simply indicated as ACK/NACK signal for simplicity. The base station receives the ACK/NACK signal from the user equipment. Then, the base station performs retransmission of the downlink data designated as NACK. When the base station transmits multiple downlink data to the user equipment, the HARQ procedure may be performed for each transmission block respective to each downlink data.

Figure 5:
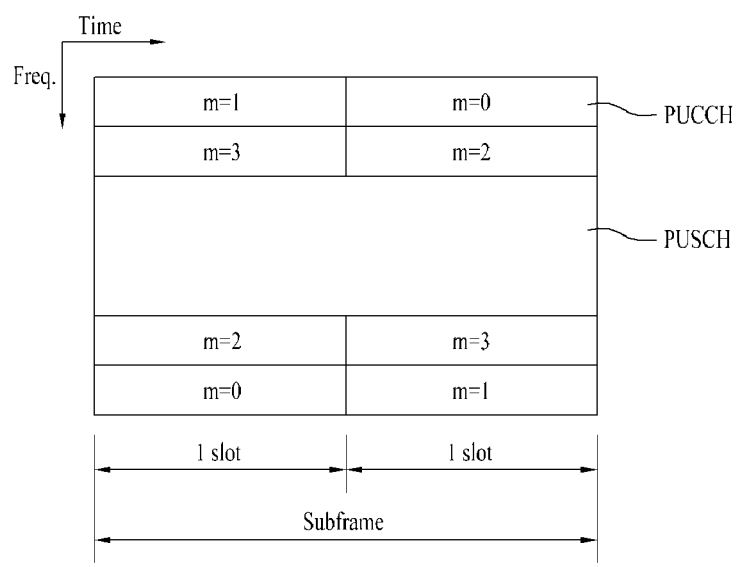
FIG. 5 illustrates an exemplary uplink sub-frame used in the LTE.

FIG. 5 illustrates an exemplary uplink sub-frame used in the LTE.

Referring to FIG. 5, the uplink subframe includes a plurality (e.g., 2) slots. Depending upon the CP length, each slot may include a different number of SC-FDMA symbols. For example, in case of a normal CP, a slot may include 7 SC-FDMA symbols. The uplink subframe is divided intro a data region and a control region. The data region includes the PUSCH and is used for transmitting data signals, such as audio signals. The control region includes the PUCCH and is used for transmitting control information. The PUCCH includes an RB pair (e.g., m=0, 1, 2, 3) positioned at each end of the data region along a frequency axis. And, the PUCCH performs hopping at slot boundaries. The control information includes ACK/NACK, CQI, PMI, RI, and so on.

Figure 6:
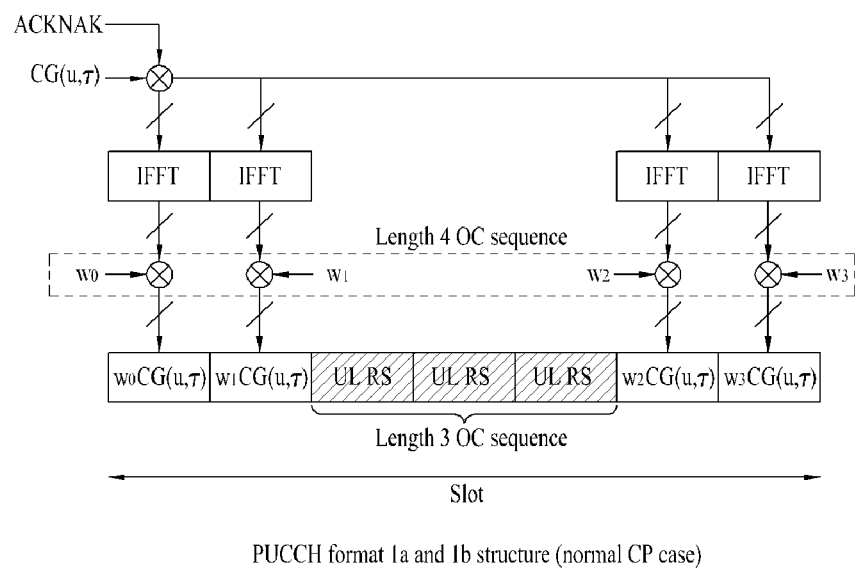
FIG. 6 illustrates an exemplary PUCCH structure for transmitting ACK/NACK.

FIG. 6 illustrates an exemplary PUCCH structure for transmitting ACK/NACK.

Referring to FIG. 6, in case of a normal CP, a reference signal (UL RS) is carried (or contained) in 3 contiguous (or consecutive) symbols positioned in the middle of the slot, and control information (i.e., ACK/NACK) is carried (or contained) in the remaining 4 symbols. In case of an extended CP, a slot includes 6 symbols, among which the $3^{rd}$ and $4^{th}$ symbols are carried (or contained) in the reference signal. The ACK/NACK received from multiple user equipments are multiplexed in one PUCCH resource by using a CDM method. The CDM method is realized by using a Cyclic Shift (CS) of a sequence for frequency distribution (or dispersion) and/or a (semi-)orthogonal dispersion code for time dispersion. For example, the ACK/NACK is differentiated by using different Cyclic Shifts (CSs) of a CG-CAZAC (Computer Generated Constant Amplitude Zero Auto Correlation) sequence (frequency dispersion) and/or by using different Walsh/DFT orthogonal codes (time dispersion). The result of multiplying by w0, w1, w2, w3 after the IFFT is identical to the result of multiplying w0, w1, w2, w3 prior to the IFFT. In the LTE system, the PUCCH resource for transmitting the ACK/NACK is expressed as a combination of the frequency-time resource (e.g., resource block) position, the cyclic shift of a sequence for frequency dispersion, and the (semi-)orthogonal dispersion code for time dispersion. Herein, each PUCCH resource is designated by using a PUCCH (resource) index.

Figure 7:
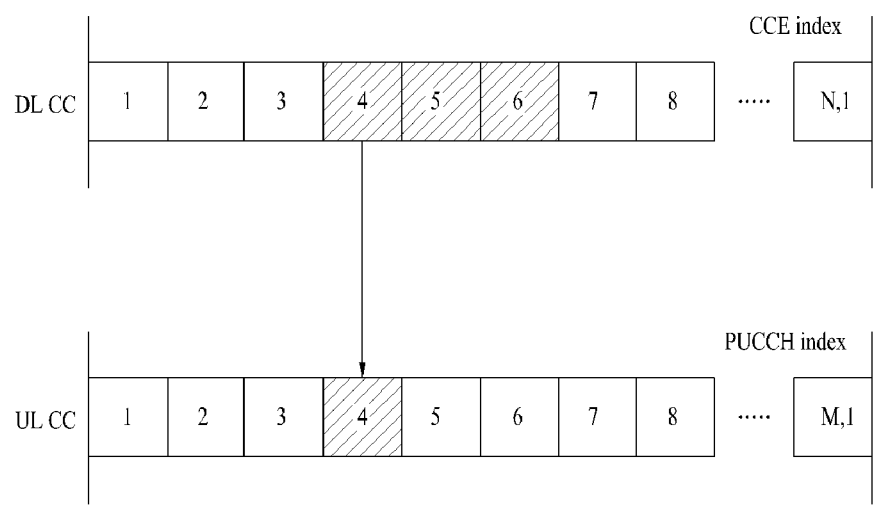
FIG. 7 illustrates an example of deciding a PUCCH resource for transmitting an ACK/NACK signal.

FIG. 7 illustrates an example of deciding a PUCCH resource for transmitting an ACK/NACK signal. In the LTE system, a PUCCH resource for the ACK/NACK is not assigned to each user equipment in advance, and, instead, the multiple user equipments share the multiple PUCCH resources at each time point. More specifically, the PUCCH resource used by the user equipment to transmit the ACK/NACK corresponds to a PDCCH, which carries and delivers scheduling information on the respective downlink data. The entire region, wherein the PDCCH is transmitted from each downlink subframe, is configured of multiple CCEs (Control Channel Elements). And, the PDCCH being transmitted to the user equipment is configured of one or more CCEs. Among the PDCCH received by the user equipment, the user equipment transmits an ACK/NACK through a PUCCH resource corresponding to a specific CCE (e.g., first CCE).

Referring to FIG. 7, in a DownLink Component Carrier each square indicates a CCE, and in an UpLink Component Carrier (UL CC) each square represents a PUCCH resource. Each PUCCH index corresponds to a PUCCH resource for the ACK/NACK. As shown in FIG. 7, when it is assumed that information on a PDSCH is being delivered through a PDCCH configured of CCE number 4~6, the user equipment transmits the ACK/NACK through PUCCH number 4, which corresponds to CCE number 4, the CCE number 4 being the first CCE configuring the PDCCH. FIG. 6 is an exemplary case where a maximum of M number of PUCCHs exists in a UL. CC, when a maximum of N number of CCEs exist in the DownLink Component Carrier. Although N may be equal to M (N=M), the M value and the N value may be differently set-up, and the mapping of the CCEs and the PUCCHs may be set to overlap one another.

More specifically, in the LTE system, a PUCCH resource index is decided as shown below.

$$n^{(1)}_{PUCCH} = n_{CCE} + N^{(1)}_{PUCCH} \quad \text{[Equation 1]}$$

Herein, $n^{(1)}_{PUCCH}$ represents a PUCCH resource index for transmitting the ACK/NACK, $N^{(1)}_{PUCCH}$ indicates a signaling value received from an upper layer, and $N_{CCE}$ represents a smallest value among a CCE index used in a PDCCH transmission.

Figure 8:
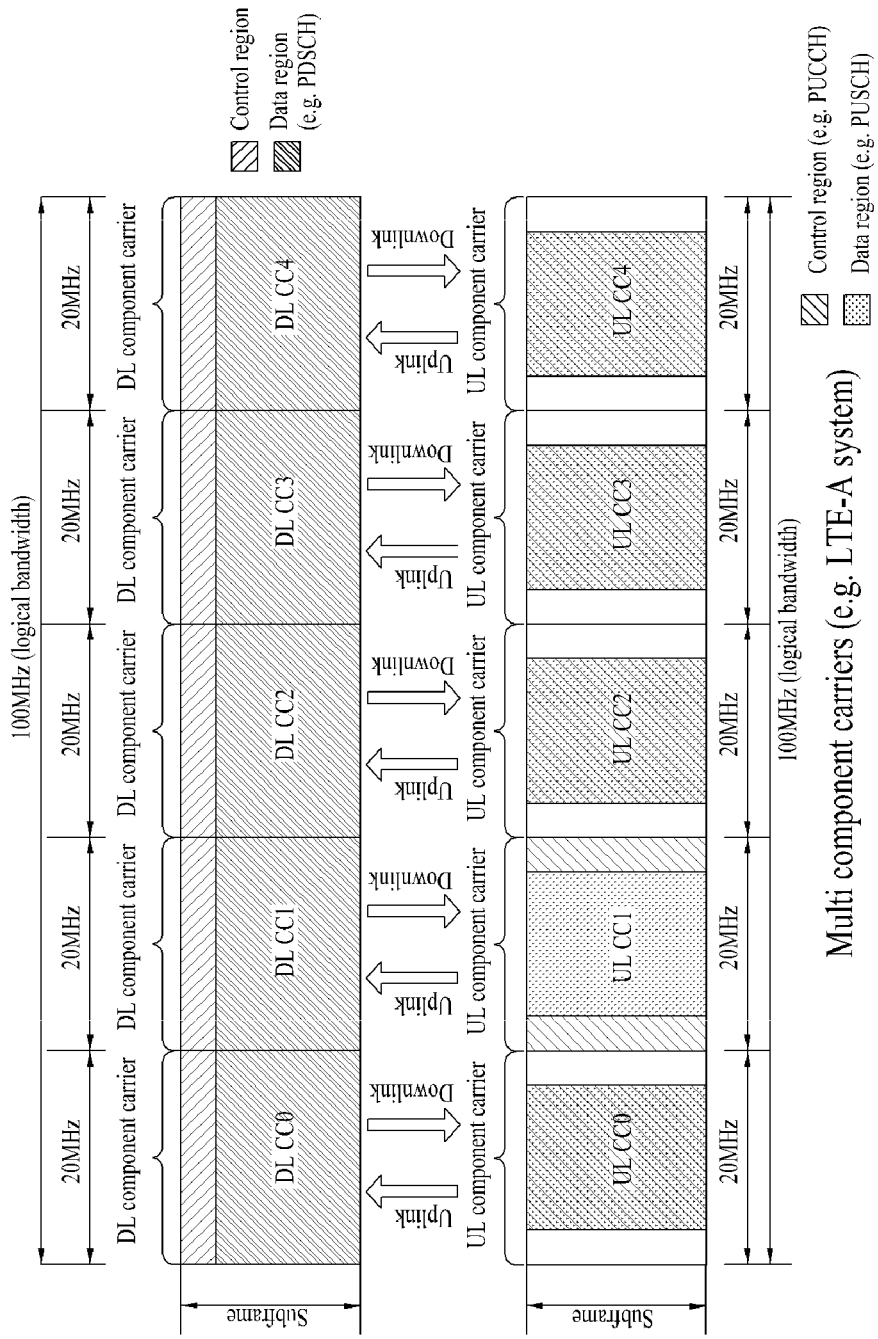
FIG. 8 illustrates an example of performing communication under a multiple component carrier condition.

FIG. 8 illustrates an example of performing communication under a multiple component carrier condition. FIG. 8 may correspond to a communication example of an LTE-A system. In order to use a wider frequency bandwidth, the LTE-A system adopts a carrier aggregation (or bandwidth aggregation) technology gathering a plurality of up-/downlink frequency blocks, so as to use a larger (or wider) up-/downlink bandwidth. Each frequency block is transmitted by using a Component Carrier (CC).

Referring to FIG. 8, 5 20 MHz CCs may be gathered in each of the up-/downlink, so as to support a 100 MHz bandwidth. The Component Carriers may be adjacent or non-adjacent to one another in the frequency domain. The radio frame structure shown in FIG. 3 may be identically applied to a case where multiple component carriers are being used. However, since the radio frame, the subframe, and the slot correspond to time units, the base station and the user equipment may, for example, transmit and receive a signal through the plurality of component carriers within a single subframe. FIG. 8 shows an example where the bandwidth of the uplink component carrier and the bandwidth of the downlink component carrier are identical to one another and are symmetrical to one another. However, the bandwidth of each component carrier may be decided independently. For example, the bandwidth of the uplink component carrier may be configured as 5 MHz (UL CC0)+20 MHz (UL CC1)+20 MHz (UL CC2)+20 MHz (UL CC3)+5 MHz (UL CC4). Also, an asymmetrical carrier aggregation (or bandwidth aggregation), wherein the number of UL CCs and the number of downlink component carriers are different from one another, may be used. The asymmetrical carrier aggregation (or bandwidth aggregation) may be generated due to a limitation in the available frequency band, or may be artificially configured by network settings. Also, although it is shown, as an example, that the uplink signal and the downlink signal are transmitted through a component carrier mapped at a one-to-one (1:1) correspondence with the signal, the component carrier through which a signal is actually being transmitted may vary depending upon the network settings or the signal type. For example, a component carrier transmitting a scheduling command and a component carrier transmitting data in accordance with a scheduling command may be different from one another. Furthermore, up-/downlink control information may be transmitted through specific uplink/downlink component carrier, regardless of the mapping state between the component carriers.

Although the present invention is not limited to this, when the number of uplink component carriers is smaller than the number of downlink component carriers, the ACK/NACK for the transmission of a plurality of downlink PDSCHs should be transmitted through a smaller number of uplink PUCCHs. Particularly, settings may be made so that the ACK/NACK for the transmission of a plurality of downlink PDSCHs is transmitted only through a specific uplink component carrier.

Also, even when the number of uplink component carriers is the same as the number of downlink component carriers, when a MIMO (Multiple Input Multiple Output) transmission method is used, or when operated via TDD, the user equipment received a plurality of transmission blocks. In this case, the user equipment should transmit the ACK/NACK signal for multiple transmission blocks through limited PUCCH resources.

Figure 9:
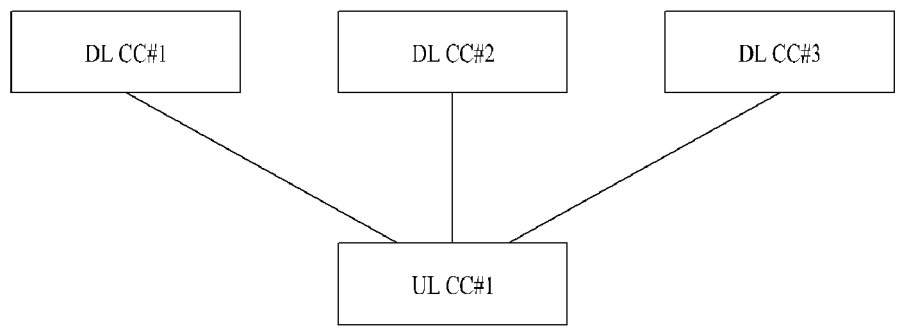
FIG. 9 illustrates an exemplary application of an asymmetrical carrier aggregation (or bandwidth aggregation) in an LTE-A system.

FIG. 9 illustrates an exemplary application of an asymmetrical carrier aggregation (or bandwidth aggregation) in an LTE-A system. Particularly, FIG. 9 shows an example wherein a plurality of transmission blocks is received through 3 downlink component carriers, and wherein the respective ACK/NACK signals are transmitted through a single uplink component carrier.

If 2 transmission blocks are transmitted to the user equipment through each of the downlink component carriers, the user equipment should feed-back 6 ACK/NACK signals to the base station a single uplink component carrier. When it is assumed that a single PUCCH resource is insufficient for transmitted multiple ACK/NACK signals, the user equipment may assign multiple PUCCH resources so as to transmit multiple ACK/NACK signals. However, due to a limited amount of transmission power in the user equipment, the assigning of the multiple PUCCH resources may cause problems, such as worsening (or aggravating) the PAPR or CM and also increasing interference between the PUCCHs.

In order to resolve such problems, an ACK/NACK bundling method is proposed. Herein, the ACK/NACK bundling method corresponds to a method of combining ACK/NACK signals for multiple data by using a logical AND operation. For example, ACK may be transmitted only when the receiving end has successfully decoded all data. And, other cases indicate that a NACK signal is transmitted or no signal is transmitted at all. However, in the related art ACK/NACK bundling method, although an overall ACK/NACK signal feedback overhead is reduced, there still remains a problem in that a re-transmission overhead increases in the base station.

Hereinafter, an ACK/NACK bundling method enabling the user equipment to efficiently transmit ACK/NACK signals through a single uplink component carrier, the user equipment having received transmission blocks through multiple downlink component carriers, in a wireless communication system applying carrier aggregation (or bandwidth aggregation), such as in the LTE-A system, is proposed.

<When the Base Station Operates in a Non-MIMO Mode>

Firstly, when the base station is in a Non-MIMO mode, i.e., when only one transmission block is transmitted through one component carrier, a method of bundling ACK/NACK signals by using one PUCCH resource and a method of bundling ACK/NACK signals by using two PUCCH resources, in a user equipment, will be described.

a) Method of Bundling ACK/NACK Signals by Using One PUCCH Resource

In case only one PUCCH is being used, and when a case of not transmitting any signal is also considered, the BPSK may indicate a maximum of 3 ACK/NACK states, the QPSK may indicate a maximum of 5 ACK/NACK states, and the 8PSK may indicate a maximum of 9 ACK/NACK states. Based upon the maximum number of ACK/NACK states that can be indicated in accordance with a modulation order, an example of bundling ACK/NACK signals by using a single PUCCH resource, thereby mapping the bundled signal to ACK/NACK state information is shown in Table 1 below.

TABLE 1

| # of downlink CCs or # of ACK/NACK over multiple CCs | State definition; Note: ACKn means number of ACK equal to n | Modulation | Example mapping; |
|---|---|---|---|
| 1 | ACK, NACK, DTX | BPSK | ACK(1), NACK(0), DTX(no Tx) ACK(1), NACK/DTX(no Tx) |
| 2 | ACK1, ACK2, NACK, DTX | BPSK | ACK1(1), ACK2(0), NACK/DTX(no Tx) |
|   |   | QPSK | ACK1(01), ACK2(10), NACK(11), DTX(no Tx) |
| 3 | ACK1, ACK2, ACK3, NACK, DTX | QPSK | ACK1(01), ACK2(10), ACK3(11), NACK(00), DTX(no Tx) ACK1(01), ACK2(10), ACK3(11), NACK/DTX(no Tx) |
| 4 | ACK1, ACK2, ACK3, ACK4, NACK, DTX | QPSK | ACK1(00), ACK2(01), ACK3(10), ACK4(11), NACK/DTX (no Tx) |
|   |   | 8PSK | ACK1(000), ACK2(001), ACK3(010), ACK4(011), NACK(100), DTX(no Tx) |
| 5 | ACK1, ACK2, ACK3, ACK4, ACK5, NACK, DTX | 8PSK | ACK1(000), ACK2(001), ACK3(010), ACK4(011), ACK5(100), [NACK(101), DTX(no Tx)] or [NACK/DTX(no Tx)] |
|   | ACK[1~2], ACK3, ACK4, ACK5, NACK, DTX | QPSK | ACK[1~2](00), ACK[3](01), ACK4(10), ACK5(11), NACK/DTX(no Tx) |
| 6 | ACK1, ACK2, ACK3, ACK4, ACK5, ACK6, NACK, DTX | 8PSK | ACK1(000), ACK2(001), ACK3(010), ACK4(011), ACK5(100), ACK6(101), [NACK(110), DTX(no Tx)] or [NACK/DTX(no Tx)] |
|   | ACK1[1~2], ACK[3~4], ACK5, ACK6, NACK, DTX | QPSK | ACK[1~2](00), ACK[3~4](01), ACK5(10), ACK6(11), NACK/DTX(no Tx) |
| 7 | ACK1, ACK2, ACK3, ACK4, ACK5, ACK6, ACK7, NACK, DTX | 8PSK | ACK1(000), ACK2(001), ACK3(010), ACK4(011), ACK5(100), ACK6(101), ACK7(110), [NACK(111), |

TABLE 1-continued

| # of downlink CCs or # of ACK/NACK over multiple CCs | State definition; Note: ACKn means number of ACK equal to n | Modulation | Example mapping; |
|---|---|---|---|
| | ACK[1~2], ACK[3~4], ACK[5~6], ACK7, NACK, DTX | QPSK | DTX(no Tx)] or [NACK/DTX(no Tx)] ACK[1~2](00), ACK[3~4](01), ACK[5~6](10), ACK7(11), NACK/DTX(no Tx) |
| 8 | ACK1, ACK2, ACK3, ACK4, ACK5, ACK6, ACK7, ACK8, NACK, DTX | 8PSK | ACK1(000), ACK2(001), ACK3(010), ACK4(011), ACK5(100), ACK6(101), ACK7(110), ACK8(111), NACK/DTX(no Tx) |
| | ACK[1~2], ACK[3~4], ACK[5~6], ACK[7~8], NACK, DTX | QPSK | ACK[1~2](00), ACK[3~4](01), ACK[5~6](10), ACK[7~8](11), NACK/DTX(no Tx) |

In Table 1, ACKn signifies a state information indicating that according to a result of decoding transmission blocks received by the user terminal through a downlink component carrier, the number of ACKs is equal to n, and, as a decoding result, ACK[x~y] represents the state information indicating that the number of ACKs is between x and y number of state information.

Referring to Table 1, it is apparent that the state information of the bundled ACK/NACK indicates how many ACKs are included. In case a NACK is being reported, since this indicates that eventually all data are retransmitted, it should be noted that there is no difference between the state information and the reporting of a non-reception of PDCCH, i.e., DTX. If the NACK and DTX are differentiated, and if the mapping points are insufficient, a method of grouping a specific number of ACK/NACK state information, such as ACK[x~y], may be taken into consideration. In this case, it is preferable to gather ACK/NACK state information that can relatively occur less. For example, if the probability of successfully decoding multiple transmission blocks is relatively greater than the probability of failing to decode the transmission block, the ACK/NACK state information having smaller ACK numbers may be bundled. Therefore, when receiving 8 transmission blocks through 8 downlink carriers, the ACK/NACK state information may be defined such as ACK[1~4], ACK5, ACK6, ACK7, and ACK8.

b) Method of Bundling ACK/NACK Signals by Using Two PUCCH Resources

Figure 10:
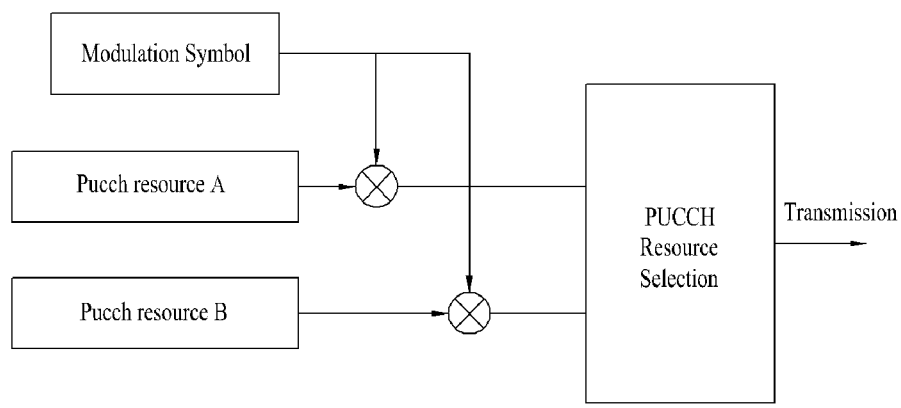
FIG. 10 illustrates a method for transmitting an ACK/NACK signal by using two PUCCH resources and one antenna according to an embodiment of the present invention.

FIG. 10 illustrates a method for transmitting an ACK/NACK signal by using two PUCCH resources and one antenna according to an embodiment of the present invention. Also, in FIG. 10, it should be noted that only one of two PUCCH resources are used for transmitting an ACK/NACK signal.

Referring to FIG. 10, when two PUCCH resources are used to feed-back the ACK/NACK state information, the ACK/NACK state may be defined by 3 factors, ID of the PUCCH resource, modulation value, and DTX (non-transmission). An example of bundling ACK/NACK signals by using two PUCCH resources, thereby mapping the bundled signal to ACK/NACK state information is shown in Table 2 below.

TABLE 2

| # of downlink CCs or # of ACK/NACK over multiple CCs | State definition; Note: ACKn means number of ACK equal to n | Modulation | Example mapping; Note: PUCCH resource is denoted as ra or rb. |
|---|---|---|---|
| 1 | ACK, NACK, DTX | | Same with Table 1 with one PUCCH resource |
| 2 | ACK1, ACK2, NACK, DTX | | Same with Table 1 with one PUCCH resource |
| 3 | ACK1, ACK2, ACK3, NACK, DTX | | Same with Table 1 with one PUCCH resource |
| | | BPSK | ACK1(ra, 0), ACK2(ra, 1), ACK3(rb, 0), [NACK(rb, 1), DTX(no Tx)] or [NACK/DTX(no Tx)] |
| 4 | ACK1, ACK2, ACK3, ACK4, NACK, DTX | | Same with Table 1 with one PUCCH resource |
| | | BPSK | ACK1(ra, 0), ACK2(ra, 1), ACK3(rb, 0), ACK4(rb, 1), NACK/DTX(no Tx) |
| 5 | ACK1, ACK2, ACK3, ACK4, ACK5, NACK, DTX | QPSK/BPSK | ACK1(ra, 00), ACK2(ra, 01), ACK3(ra, 10), ACK4(ra, 11), ACK5(rb, 0), [NACK(rb, 1), DTX(no Tx)] or [NACK/DTX(no Tx)] ACK1(ra, 00), ACK2(ra, 01), ACK3(ra, 10), [ACK4(ra, 11), ACK5(rb, 0), NACK(rb, 1), DTX(no Tx)] or [ACK4(rb, 1), ACK5(rb, 0), NACK/DTX(no Tx)] |
| 6 | ACK1, ACK2, ACK3, ACK4, ACK5, ACK6, NACK, DTX | QPSK/BPSK | ACK1(ra, 00), ACK2(ra, 01), ACK3(ra, 10), ACK4(ra, 11), [ACK5(rb, 00), ACK6(rb, 01), NACK(rb, 10), DTX(no Tx)] or [ACK5(rb, 0), ACK6(rb, 1), NACK/DTX(no Tx)] |
| 7 | ACK1, ACK2, ACK3, ACK4, ACK5, ACK6, ACK7, NACK, DTX | QPSK | ACK1(ra, 00), ACK2(ra, 01), ACK3(ra, 10), ACK4(ra, 11), ACK5(rb, 00), ACK6(rb, 01), ACK7(rb, 10), [NACK(rb, 11), DTX(no Tx) or [NACK/ |

TABLE 2-continued

| # of downlink CCs or # of ACK/NACK over multiple CCs | State definition; Note: ACKn means number of ACK equal to n | Modulation | Example mapping; Note: PUCCH resource is denoted as ra or rb. |
|---|---|---|---|
| 8 | ACK1, ACK2, ACK3, ACK4, ACK5, ACK6, ACK7, ACK8, NACK, DTX | QPSK | DTX(no Tx)] ACK1(ra, 00), ACK2(ra, 01), ACK3(ra, 10), ACK4(ra, 11), ACK5(rb, 00), ACK6(rb, 01), ACK7(rb, 10), ACK8(rb, 11), NACK/DTX(no Tx) |
| 9 | ACK1, ACK2, ACK3, ACK4, ACK5, ACK6, ACK7, ACK8, ACK9, NACK, DTX | QPSK/ 8PSK | ACK1(ra, 001) ACK2(ra, 010) ACK3(ra, 100), ACK4(ra, 110), ACK5(ra, 000), ACK6(rb, 01), ACK7(rb, 10), ACK8(rb, 11), ACK9(rb, 00), NACK/DTX(no Tx) |
|  | ACK[1~2], ACK3, ACK4, ACK5, ACK6, ACK7, ACK8, ACK9, NACK, DTX | QPSK | ACK[1~2](ra, 00), ACK3(ra, 10), ACK4(ra, 11), ACK5(ra, 01), ACK6(rb, 01), ACK7(rb, 10), ACK8(rb, 11), ACK9(rb, 00), NACK/DTX(no Tx) |
| 10 | ACK1, ACK2, ACK3, ACK4, ACK5, ACK6, ACK7, ACK8, ACK9, ACK10, NACK, DTX | QPSK/ 8PSK | ACK1(ra, 001), ACK2(ra, 010), ACK3(ra, 100), ACK4(ra, 110), ACK5(ra, 000), ACK6(rb, 001), ACK7(rb, 100), ACK8(rb, 110), ACK9(rb, 000), ACK10(rb, 010), NACK/DTX(no Tx) |
|  | ACK[1~2], ACK[3~4], ACK5, ACK6, ACK7, ACK8, ACK9, ACK10, NACK, DTX | QPSK | ACK[1~2](ra, 00), ACK[3~4](ra, 10), ACK5(ra, 11), ACK6(ra, 01), ACK7(rb, 01), ACK8(rb, 10), ACK9(rb, 11), ACK10(rb, 00), NACK/DTX(no Tx) |

Generally, in the aspect of reliability, the QPSK shows a better performance than the 8PSK. Therefore, it is apparent that the 8PSK method is used for transmitting a large number of ACK/NACK signals, such as when transmitting 9 or 10 ACK/NACK signals.

Also, even when indicating the ACK/NACK state information in a bundle, it is preferable to bundle (or gather) cases that can occur relatively less. Therefore, when 10 transmission blocks are received through 10 downlink carriers, since the probability of successfully performing decoding is relatively greater than the probability of failing to perform decoding, the ACK/NACK state information may be defined as ACK [1~3], ACK4, ACK5, ACK6, ACK7, ACK8, ACK9, and ACK10.

<When the Base Station Operates in a MIMO Mode>

If the base station is operated in a MIMO mode, the space domain is also required to be taken into consideration for the ACK/NACK bundling. More specifically, when 2 transmission blocks are received through a single downlink component carrier, the ACK/NACK state information may also include the index of each transmission block as its factor.

However, since the application of the MIMO mode may differ for each of the downlink component carriers, it is preferable that the ACK/NACK state information is defined based upon a maximum number of transmission blocks that can be transmitted through the downlink component carrier.

Additionally, depending upon whether or not an uplink transmission of a user equipment is operated in the MIMO mode, the ACK/NACK bundling method may differ.

a) When the Uplink Transmission of the User Equipment is in a Non-MIMO Mode

In case the base station transmits each of the multiple transmission blocks through a respective downlink component carrier, and in case the user equipment transmits a single uplink component carrier as a response to the above through a single antenna, the ACK/NACK state information may be defined as shown in Table 3 below. Particularly, it is assumed in Table 3 that two transmission blocks are received through a single downlink component carrier.

TABLE 3

| # of DL CCs | Bundled ACK/ NACK state | | # of PUCCH resources | Example Mapping: Note: PUCCH resource is denoted as rk, where n can be 1 to n. |
|---|---|---|---|---|
| 1~5 | ACKA[1~5], NACKA, DTX | ACKB[1~5], NACKB, DTX | 1 | (ACKA[1~5], ACKB[1~5]) = (00), (NACKA, ACKB[1~5]) = (01), (ACKA[1~5], NACKB) = (10), (NACKA, NACKB) = (11) DTX(no Tx) |
| n | ACKA[k], NACKA, DTX k = 1, 2, . . . , 5 | ACKB[k], NACKB, DTX, k = 1, 2, . . . , 5 | <=n | (ACKA[k], ACKB[k]) = (rk, 00), (NACKA, ACKB[k]) = (rk, 01), (ACKA[k], NACKB) = (rk, 10), (NACKA, NACKB) = (rk, 01), DTX(no Tx) |

In Table 3, ACKA[1~5] indicates that the decoding result of the transmission block A received through the downlink component carriers corresponds to ACK, and ACKB[1~5] indicates that the decoding result of the transmission block B received through the downlink component carriers corresponds to ACK.

If the modulation method is limited to the QPSK as shown in Table 3, it is apparent that in order to express (or indicate) the number of all ACKs that can be generated, a number of PUCCH resources corresponding to the number of downlink component carriers is required. Also, if the number of PUCCH resources is smaller than the number of downlink component carriers, it is preferable to bundle (or gather) ACK/NACK states that can be generated relatively more, as shown in Table 1 and Table 2, in order to reduce the number of ACK/NACK state information.

b) When the Uplink Transmission of the User Equipment is in an MIMO Mode

Figure 11:
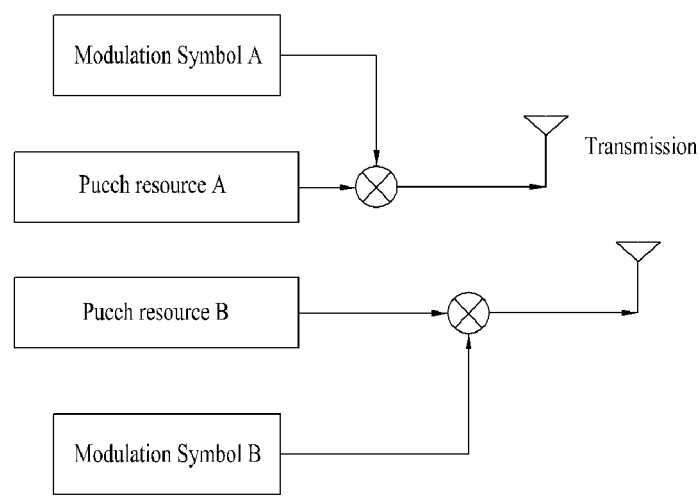
FIG. 11 illustrates a method for transmitting an ACK/NACK signal in a user terminal through two PUCCIH resources and two respective antennae.

FIG. 11 illustrates a method for transmitting an ACK/NACK signal in a user terminal through two PUCCH resources and two respective antennae.

In case the user equipment performs uplink transmission by using multiple antennae, a method of defining ACK/NACK state information based upon the transmission block, by primarily performing the methods shown in Table 1 and Table 2 from each antenna, may be taken into consideration.

Also, when the number of transmission blocks being received through each downlink component carrier is the same, the ACK/NACK state information may be defined as shown in Table 4 below. Most particularly, in Table 4, it is assumed that 2 transmission blocks are received through a single downlink component carrier and that an uplink modulation method is limited to QPSK.

TABLE 4

| # of DL CCs | Bundled ACK/NACK state | Modulation | Example Mapping |
|---|---|---|---|
| 1 | (ACKA, ACKB)[1], (ACKA, NACKB)[1], (NACKA, ACKB)[1], NACK, DTX | BPSK | (ACKA, ACKB)[1] = (0, 0), (ACKA, NACKB)[1] = (1, 0), (NACKA, ACKB)[1] = (0, 1), [NACK = (1, 1), DTX(no Tx)] or [NACK/DTX(no Tx)] |
| 2 | (ACKA, ACKB)[k], (ACKA, NACKB)[k], (NACKA, ACKB)[k], NACK, DTX k = 1, 2 | BPSK/ QPSK | (ACKA, ACKB)[1] = (00, 0), (ACKA, NACKB)[1] = (01, 0), (NACKA, ACKB)[1] = (10, 0), (ACKA, ACKB)[2] = (11, 0), (ACKA, NACKB)[2] = (00, 1), (NACKA, ACKB)[2] = (01, 1), [NACK = (10, 1), DTX(no Tx)] or [NACK/DTX(no Tx)] |
| 3 | (ACKA, ACKB)[k], ACKA, NACKB)[k], (NACKA, ACKB)[k], NACK, DTX k = 1, 2, 3 | QPSK | (ACKA, ACKB)[1] = (00, 00), (ACKA, NACKB)[1] = (01, 00), (NACKA, ACKB)[1] = (10, 00), (ACKA, ACKB)[2] = (11, 00), (ACKA, NACKB)[2] = (00, 01), (NACKA, ACKB)[2] = (01, 01), (ACKA, ACKB)[3] = (10, 01), (ACKA, NACKB)[3] = (11, 01), (NACKA, ACKB)[3] = (00, 10), [NACK = (01, 10), DTX(no Tx)] or [NACK/DTX(no Tx)] |
| 4 | (ACKA, ACKB)[k], (ACKA, NACKB)[k], (NACKA, ACKB)[k], NACK, DTX k = 1, 2, 3, 4 | QPSK | (ACKA, ACKB)[1] = (00, 00), (ACKA, NACKB)[1] = (01, 00), (NACKA, ACKB)[1] = (10, 00), (ACKA, ACKB)[2] = (11, 00), (ACKA, NACKB)[2] = (00, 01), (NACKA, ACKB)[2] = (01, 01), (ACKA, ACKB)[3] = (10, 01), (ACKA, NACKB)[3] = (11, 01), (NACKA, ACKB)[3] = (00, 10), (ACKA, ACKB)[4] = (01, 10), (ACKA, NACKB)[4] = (10, 10), (NACKA, ACKB)[4] = (11, 10), [NACK = (00, 11), DTX(no Tx)] or [NACK/DTX(no Tx)] |
| 5 | (ACKA, ACKB)[k], (ACKA, NACKB)[k], (NACKA, ACKB)[k], NACK, DTX k = 1, 2, 3, 4, 5 | QPSK | (ACKA, ACKB)[1] = (00, 00), (ACKA, NACKB)[1] = (01, 00), (NACKA, ACKB)[1] = (10, 00), (ACKA, ACKB)[2] = (11, 00), (ACKA, NACKB)[2] = (00, 01), (NACKA, ACKB)[2] = (01, 01), (ACKA, ACKB)[3] = (10, 01), (ACKA, NACKB)[3] = (11, 01), (NACKA, ACKB)[3] = (00, 10), (ACKA, ACKB)[4] = (01, 10), (ACKA, NACKB)[4] = (10, 10), (NACKA, ACKB)[4] = (11, 10), (ACKA, ACKB)[5] = (00, 11), (ACKA, NACKB)[5] = (01, 11), (NACKA, ACKB)[5] = (10, 11), [NACK = (11, 11), DTX(no Tx)] or [NACK/DTX(no Tx)] |

In Table 4, (x,y)[k] indicates ACK/NACK state information x being transmitted by using a first PUCCH resource and ACK/NACK state information y being transmitted by using a second PUCCH resource. Therefore, (ACKA,ACKB)[k] indicates that the decoding results of the transmission block A and the transmission block B received through a $k^{th}$ downlink component carrier respectively corresponds to an ACK.

If there exists a limitation in an uplink transmission power of the user equipment, and, therefore, if only one PUCCH resource can be used at one transmission point, it is required to reduce the number of ACK/NACK state information. For example, as shown in Table 4, when the numbers of downlink component carriers correspond to 1, 2, 3, 4, and 5, each case may be respectively indicated by 5, 8, 11, 14, and 17 ACK/NACK state information. In this case, since the user terminal uses only QPSK as the modulation method, and since a total of 9 ACK/NACK state information may be expressed (or indicated) by using 2 PUCCH resources, a specific number of ACK/NACK state information should be bundled so as to be expressed within the range of 9 ACK/NACK state information.

Therefore, even when bundling the ACK/NACK state information, it is preferable to bundle ACK/NACK state information that can be generated relatively less, as shown in Table 1 and Table 2. Table 5 below shows an example of reducing the number of ACK/NACK state information shown in Table 4.

TABLE 5

| # of DL CCs | Bundled ACK/NACK state | Modulation | Example Mapping; Note: PUCCH resource is denoted as rk, where n can be 1 to n. |
|---|---|---|---|
| 1 | (ACKA, ACKB)[1], (ACKA, NACKB)[1], (NACKA, ACKB)[1], NACK, DTX | BPSK | (ACKA, ACKB)[1] = (ra, 0), (ACKA, NACKBA[1] = (ra, 1), (NACKA, ACKB)[1] = (rb, 0), [NACK = (rb, 1), DTX(no Tx)] or [NACK/DTX(no Tx)] |
| 2 | (ACKA, ACKB)[k], (ACKA, NACKB)[k], (NACKA, ACKB)[k], NACK, DTX k = 1, 2 | BPSK/ QPSK | (ACKA, ACKB)[1] = (ra, 0), (ACKA, NACKB)[1] = (ra, 00), (NACKA, ACKB)[1] = (rb, 00), (ACKA, ACKB)[2] = (rb, 01), (ACKA, NACKB)[2] = (rb, 10), (NACKA, ACKB)[2] = (rb, 11), NACK/DTX(no Tx) (ACKA, ACKB)[1] = (ra, 00), (ACKA, NACKB)[1] = (ra, 10), (NACKA, ACKB)[1] = (rb, 00), (ACKA, ACKB)[2] = (rb, 01), (ACKA, NACKB)[2] = (rb, 10), (NACKA, ACKB)[2] = (rb, 11), [NACK = (ra, 11), DTX(no Tx)] or [NACK/DTX(no Tx)] |
| 3 | (ACKA, ACKB)[k], (ACKA, NACKB)[k], (NACKA, ACKB)[k], NACK, DTX k = 1, 2, 3 — Merged states (ACKA, NACKB)[3] = (NACKA, ACKB)[3] | QPSK | (ACKA, ACKB)[1] = (ra, 00), (ACKA, NACKB)[1] = (ra, 01), (NACKA, ACKB)[1] = (ra, 10), (ACKA, ACKB)[2] = (ra, 11), (ACKA, NACKB)[2] = (rb, 00), (NACKA, ACKB)[2] = (rb, 01), (ACKA, ACKB)[3] = (rb, 10), (ACKA, NACKB)[3] = (rb, 11), (NACKA, ACKB)[3] = (rb, 11), NACK/DTX(no Tx) |
| 4 | (ACKA, ACKB)[k], (ACKA, NACKB)[k], (NACKA, ACKB)[k], NACK, DTX k = 1, 2, 3, 4 Merged states (ACKA, ACKB)[p], (ACKA, ACKB)[q], (ACKA, NACKB)[p] = (NACKA, ACKB)[q] p = 3, 4, q = 3, 4 | QPSK | (ACKA, ACKB)[1] = (ra, 00), (ACKA, NACKB)[1] = (ra, 01), (NACKA, ACKB)[1] = (ra, 10), (ACKA, ACKB)[2] = (ra, 11), (ACKA, NACKB)[2] = (rb, 00), (NACKA, ACKB)[2] = (rb, 01), (ACKA, ACKB)[3] = (rb, 10), (ACKA, NACKB)[3] = (rb, 11), (NACKA, ACKB)[3] = (rb, 11), (ACKA, ACKB)[4] = (rb, 10), (ACKA, NACKB)[4] = (rb, 11), |

TABLE 5-continued

| # of DL CCs | Bundled ACK/NACK state | Modulation | Example Mapping; Note: PUCCH resource is denoted as rk, where n can be 1 to n. |
|---|---|---|---|
| 5 | (ACKA, ACKB)[k], (ACKA, NACKB)[k], (NACKA, ACKB)[k], NACK, DTX k = 1, 2, 3, 4, 5 Merged states (ACKA, ACKB)[p] = (ACKA, ACKB)[q] (ACKA, NACKB)[p] = (NACKA, ACKB)[q] p = 3, 4, 5 q = 3, 4, 5 | QPSK | (NACKA, ACKB)[4] = (rb, 11), NACK/DTX(no Tx) (ACKA, ACKB)[1] = (ra, 00), (ACKA, NACKB)[1] = (ra, 01), (NACKA, ACKB)[1] = (ra, 10), (ACKA, ACKB)[2] = (ra, 11), (ACKA, NACKB)[2] = (rb, 00), (NACKA, ACKB)[2] = (rb, 01), (ACKA, ACKB)[3] = (rb, 10), (ACKA, NACKB)[3] = (rb, 11), (NACKA, ACKB)[3] = (rb, 11), (ACKA, ACKB)[4] = (rb, 10), (ACKA, NACKB)[4] = (rb, 11), (NACKA, ACKB)[4] = (rb, 11), (ACKA, ACKB)[5] = (rb, 10), (ACKA, NACKB)[5] = (rb, 11), (NACKA, ACKB)[5] = (rb, 11), NACK/DTX(No Tx) |

In Table 5, since a case where the number of downlink component carriers is more than or equal to 3 occurs less than a case where the number of downlink component carriers is less than 3, the bundling of the ACK/NACK state information starts from the case where the number of downlink component carriers is less than 3, i.e., the ACK/NACK state information is expressed with the same resource and modulation value. Therefore, the ACK/NACK state of Table 5 is expressed by using 9 ACK/NACK state information.

Hereinafter, when performing ACK/NACK bundling, operations of the user equipment according to the ACK/NACK state information (e.g., when all states correspond to ACK, when all states correspond to NACK, when all states correspond to DTX, and when partial states correspond to ACK, i.e., number information of ACK).

Firstly, a general operation of the base station and user equipment according to the HARQ method will be described as follows. After the base station transmits a control channel to the user equipment, the base station transmits a data channel depending upon the control channel. When the control channel has been successfully received, the user equipment receives the data channel so as to attempt decoding. Once the user equipment successfully performs decoding of the data channel, an ACK signal is generated. However, if the user equipment fails to perform decoding, an NACK signal is generated. More specifically, when the user equipment fails to receive the control channel, i.e., in a DTX state, ACK/NACK signals are not transmitted, and depending upon the success or failure in the decoding of the data channel, an ACK or NACK signal is transmitted to the base station.

When the base station receives an ACK from the user equipment, the base station performs a new transmission, and when the base station receives an NACK from the user equipment, the base station performs retransmission. Also, in a DTX state, a new transmission is performed.

Hereinafter, the operations of a base station and a user equipment using ACK/NACK bundling according to the present invention will now be described. However, during carrier aggregation (or bandwidth aggregation), the control channel and the data channel may be independently scheduled and transmitted for each component carrier or regardless of the component carrier.

Firstly, the base station transmits a control channel to the user equipment and, then, transmits a data channel depending upon the control channel. Herein, the control channel signifies control channel related to one or more data channels, which are scheduled to multiple downlink component carriers. And, each of the control channels may be processed with Joint Coding or processed with Separate Coding. Also, the data channel may be independently transmitted through multiple downlink component carriers.

If the control channels are processed with Joint Coding, and when the control channel reception is successful, the user equipment receives the data channel, and when the control channel reception is failed, the user equipment does not receive the data channel.

However, if the control channels are processed with Separate Coding, and when the control channel reception is successful, the user equipment receives the data channel. And, when the decoding of all data channels is successful, an ACK signal is transmitted. However, when decoding of even one data channel is failed (or unsuccessful), a NACK signal is transmitted. Also, when control channel reception is failed, the data channel is not received and no response is transmitted (i.e., DTX).

Accordingly, when the control channels are processed with Separate Coding, and when the user equipment bundles the ACK/NACK/DTX signals for each downlink data channel, so as to transmit the state information, the user equipment cannot identify (or differentiate) the case wherein the user equipment cannot receive a specific control channel and, therefore, has a DTX, and wherein decoding of the remaining data channels is all successful, thereby transmitting an ACK, and the case wherein all control channels are normally received without any DTX, and wherein decoding of all data channels is also successful, thereby transmitting an ACK. Therefore, such problems may be resolved by using the transmission of information on the number of ACKs according to the present invention.

More specifically, when the base station receives an ACK for all data channels transmitted from the user equipment, the base station performs a new transmission. Also, when a NACK is received in the A/N information transmitted from the user equipment, retransmission may be performed. However, all data channels that were transmitted during the initial transmission are all retransmitted.

However, when ACK is received for some of the data channels, i.e., when the number of data channels during the initial transmission from the base station is different from the number of ACKs received from the user equipment, the base station may either perform a new transmission of all data channels or perform retransmission.

When the base station selects new transmission, since the user terminal has already transmitted ACKs in accordance with the decoding result of the previous transmission, the user terminal may regard the newly received data channels as a completely new set of data channels.

If the base station select retransmission and performs transmission accordingly, the user equipment s not required to perform additional decoding on the data channels for which the user equipment had previously transmitted ACKs. Nevertheless, the user equipment should be able to perform blind decoding on the remaining data channels. In order to do so, it is preferable that the user equipment stores the subframes, on which the previous decoding was performed, in a buffer until the user equipment receives new data indication from the base station.

Alternatively, when the respective subframes are not stored in the buffer, the user equipment may simply perform decoding only on the currently received PDSCH in accordance with the retransmission control channel information.

Meanwhile, when the separately coded PDCCH is received for each downlink component carrier, and when there is not means for knowing the number of the received PDCCHs, a method of notifying the number of ACKs via uplink should be performed, as described in the method proposed above.

However, when information indicating the number of scheduled PDSCHs existing in the downlink component carrier is included through the downlink control channel, the user equipment may perform ACK/NACK bundling in accordance with the indicated number. More specifically, when the number of downlink component carriers including the scheduled PDSCHs can be known through the downlink control channel, the user equipment is not required to feed-back information on the umber of ACKs via uplink.

In this case, when the number of actually decoded PDSCHs is different from the number of downlink component carriers including the scheduled PDSCHs indicated by the base station, the user equipment shall transmit a NACK without exception. Also, when an error exists in the decoded PDSCH, a NACK is transmitted. Also, when the number of actually decoded PDSCHs is equal to the number of downlink component carriers including the scheduled PDSCHs indicated by the base station, and when there is no error in the decoded PDSCH, the user equipment transmits ACK.

Therefore, depending upon a case wherein the number of downlink component carriers including the scheduled PDSCHs is received through the downlink control channel, bundling may be performed as 1) a simple bundling to ACK, NACK, DTX, or 2) a bundling to ACK+number of decoded PDSCHs, NACK, DTX. Additionally, bundling may also be performed as 3) a bundling to ACK+number of decoded PDSCHs, NACK+number of decoded PDSCHs, DTX. Alternatively, when the number of scheduled PDSCHs (or number of PDCCHs) is notified or can be known, the ACK, NACK, DTX are not bundled and may each be transmitted in accordance with a pre-decided ACK/NACK transmission format. At this point, depending upon the number of required bits, transmission may be performed by using multiple PUCCH resources, or transmission may be performed by selecting a specific PUCCH resource from the multiple PUCCH resources. Also, in this case, by defining a PUCCH format 2 type or a new PUCCH format, a format of transmitting only a designated number of ACK/NACK/DTX may be available.

Depending upon such bundling methods, the number of PUCCH resources that can send ACK/NACK may be automatically decided and used, or the PUCCH format may be modified and used. In case information indicating the number of scheduled PDSCHs is included in the PDCCH, when the user equipment transmits ACK, it may be estimated that the data being transmitted from the base station at a specific transmission point correspond to new data. When the user equipment transmits NACK, it may be estimated that a new data indicator is received or that retransmission will be performed.

At this point, when a new data indicator is received, the user equipment performs decoding through Chase Combining. And, when a retransmission control information is received, the user equipment may simultaneously perform Incremental Redundancy and decoding through Chase Combining.

Figure 12:
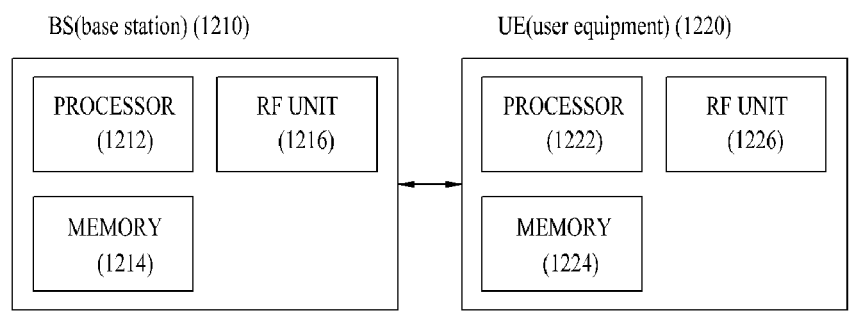
FIG. 12 illustrates an exemplary base station and an exemplary user terminal that can be applied to the embodiment of the present invention.

FIG. 12 illustrates an exemplary base station and an exemplary user terminal that can be applied to the embodiment of the present invention.

Referring to FIG. 12, a wireless communication system includes a base station (BS, 1210) and a user equipment (UE, 1220). In a downlink, the transmitter corresponds to a portion of the base station (1210), and the receiver corresponds to a portion of the user equipment (1220). In an uplink, the transmitter corresponds to a portion of the user equipment (1220), and the receiver corresponds to a portion of the base station (1210).

The base station (1210) includes a processor (1212), a memory (1214), and a Radio Frequency (RF) unit (1216). The processor (1212) may be configured to realize procedures and/or methods proposed in the present invention. The memory (1214) is connected to the processor (1212) and stores diverse information related to the operation of the processor (1212). The RF unit (1216) is connected to the processor (1212) and transmits and/or receives radio signals. More specifically, the RF unit (1216) includes a transmitting module and a receiving module.

The user equipment (120) includes a processor (1222), a memory (1224), and an RF unit (1226). The processor (1222) may be configured to realize procedures and/or methods proposed in the present invention. The memory (1224) is connected to the processor (1222) and stores diverse information related to the operation of the processor (1222). The RF unit (1226) is connected to the processor (1222) and transmits and/or receives radio signals. More specifically, the RF unit (1226) includes a transmitting module and a receiving module.

The base station (1210) and/or the user equipment (1220) may have a single antenna or multiple antennae.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the terminal may be replaced with terms such as UE (User Equipment), MS (Mobile Station), and MSS (Mobile Subscriber Station).

The embodiments according to the present invention can be implemented by various means, for example, hardware, firmware, software, or their combination. If the embodiment according to the present invention is implemented by hardware, the embodiment of the present invention can be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention may be applied in a wireless communication system. More specifically, the present invention may be applied to a method and apparatus for transmitting ACK/NACK information in a wireless communication system applying carrier aggregation (or bandwidth aggregation).

What is claimed is:

1. A method for transmitting Acknowledgement/Negative-Acknowledgement (ACK/NACK) state information to a base station (BS) at a user equipment (UE) in a wireless communication system, the method comprising:
   receiving two or more transmission blocks through two or more downlink component carriers from the BS; and
   transmitting information on a number of ACK responses among ACK/NACK responses corresponding to each of the two or more transmission blocks through a single uplink component carrier to the BS.

2. The method of claim 1, wherein the information on the number of ACK responses is transmitted by using two or more Physical Uplink Control CHannel (PUCCH) resources included in the single uplink component carrier.

3. The method of claim 1, wherein the information on the number of ACK responses is transmitted by using a Physical Uplink Control CHannel (PUCCH) resource included in the single uplink component carrier.

4. The method of claim 1, wherein the information on the number of ACK responses further indicates a case where at least one downlink assignment for the two or more transmission blocks has been missed at the UE.

5. A user equipment comprising:
   a receiving module configured to receive two or more transmission blocks through two or more downlink component carriers from a base station; and
   a transmitting module configured to transmit information on a number of Acknowledgement (ACK) responses among ACK//Negative-Acknowledgement (NACK) responses corresponding to each of the two or more transmission blocks through a single uplink component carrier to the base station.

6. The user equipment of claim 5, wherein the information on the number of ACK responses is transmitted by using two or more Physical Uplink Control CHannel (PUCCH) resources included in the single uplink component carrier.

7. The user equipment of claim 5, wherein the information on the number of ACK responses is transmitted by using a Physical Uplink Control CHannel (PUCCH) resource included in the single uplink component carrier.

8. The user equipment of claim 5, wherein the information on the number of ACK responses further indicates a case where at least one downlink assignment for the two or more transmission blocks has been missed at the UE.

* * * * *